US009452442B2

(12) United States Patent
Selby et al.

(10) Patent No.: US 9,452,442 B2
(45) Date of Patent: Sep. 27, 2016

(54) ELECTRONIC SPRAY DEVICE IMPROVEMENTS

(75) Inventors: Robert Gordon Maurice Selby, Royston (GB); Daniel Crichton, Cambridge (GB)

(73) Assignee: The Technology Partnership PLC (GB)

( * ) Notice: Subject to any disclaimer, the term of this patent is extended or adjusted under 35 U.S.C. 154(b) by 675 days.

(21) Appl. No.: 13/816,361

(22) PCT Filed: Aug. 11, 2011

(86) PCT No.: PCT/GB2011/051516
§ 371 (c)(1), (2), (4) Date: Apr. 18, 2013

(87) PCT Pub. No.: WO2012/020262
PCT Pub. Date: Feb. 16, 2012

(65) Prior Publication Data

US 2013/0277446 A1 Oct. 24, 2013

(30) Foreign Application Priority Data

Aug. 11, 2010 (GB) .................................. 1013463.3

(51) Int. Cl.

| | |
|---|---|
| ***B05B 17/04*** | (2006.01) |
| ***A01G 27/00*** | (2006.01) |
| ***B05B 1/08*** | (2006.01) |
| ***B05B 3/04*** | (2006.01) |
| ***B05B 5/00*** | (2006.01) |
| ***F23D 11/32*** | (2006.01) |
| ***B05B 17/00*** | (2006.01) |
| ***B05B 17/06*** | (2006.01) |
| ***B06B 1/06*** | (2006.01) |

(52) U.S. Cl.
CPC ....... *B05B 17/0646* (2013.01); *B05B 17/0669* (2013.01); *B06B 1/0688* (2013.01)

(58) Field of Classification Search
CPC .......... B05B 17/0669; B05B 17/0646; B05B 1/0688
USPC ...... 239/4, 102.1, 102.2, 699, 67, 68, 69, 70
See application file for complete search history.

(56) References Cited

U.S. PATENT DOCUMENTS 4,113,809 A * 9/1978 Abair et al. .................... 261/81
4,338,576 A * 7/1982 Takahashi et al. ............. 331/67
(Continued)

FOREIGN PATENT DOCUMENTS

DE 102005005540 8/2006
EP 1731228 12/2006
(Continued)

*Primary Examiner* — Len Tran
*Assistant Examiner* — Steven M Cernoch
(74) *Attorney, Agent, or Firm* — Tarolli, Sundheim, Covell & Tummino LLP

(57) ABSTRACT

An electronic spray device comprising a spray generator and a spray controller for providing a drive signal to the spray generator, wherein the spray generator includes a perforate membrane which vibrates ultrasonically in response to the drive signal, said vibration causing liquid droplets to be ejected from one side of the perforate membrane, wherein the spray controller is adapted to modulate the drive signal sent to the spray generator, wherein such modulation of the drive signal is arranged to set the mean power level supplied to the spray generator to a target level.

9 Claims, 6 Drawing Sheets

(56) References Cited

U.S. PATENT DOCUMENTS

| | | | | |
|---|---|---|---|---|
| 4,659,014 | A * | 4/1987 | Soth et al. | 239/102.2 |
| 5,164,740 | A * | 11/1992 | Ivri | 347/54 |
| 5,297,734 | A * | 3/1994 | Toda | 239/102.2 |
| 5,312,281 | A * | 5/1994 | Takahashi et al. | 446/25 |
| 5,518,179 | A | 5/1996 | Humberstone et al. | |
| 5,657,926 | A * | 8/1997 | Toda | 239/102.2 |
| 5,716,002 | A * | 2/1998 | Haack et al. | 239/102.1 |
| 5,803,362 | A * | 9/1998 | Fraccaroli | 239/102.2 |
| 6,357,671 | B1 * | 3/2002 | Cewers | 239/102.2 |
| 6,439,474 | B2 | 8/2002 | Denen | |
| 6,712,287 | B1 | 3/2004 | Le Pesant et al. | |
| 6,969,008 | B2 * | 11/2005 | Helf et al. | 239/4 |
| 7,017,829 | B2 * | 3/2006 | Martens et al. | 239/44 |
| 7,389,943 | B2 * | 6/2008 | Jaworski | 239/102.2 |
| 7,455,245 | B2 * | 11/2008 | Sipinski et al. | 239/102.2 |
| 7,673,812 | B2 * | 3/2010 | Weng et al. | 239/102.2 |
| 8,296,993 | B2 * | 10/2012 | Modlin et al. | 43/132.1 |
| 8,955,765 | B2 * | 2/2015 | Porchia et al. | 239/67 |
| 2007/0152081 | A1 | 7/2007 | Chou et al. | |
| 2008/0011875 | A1 * | 1/2008 | Sipinski et al. | 239/102.2 |
| 2009/0114737 | A1 * | 5/2009 | Yu et al. | 239/69 |
| 2009/0127351 | A1 * | 5/2009 | Powell et al. | 239/69 |

FOREIGN PATENT DOCUMENTS

| | | |
|---|---|---|
| WO | 2005097348 | 10/2005 |
| WO | 2008004194 | 1/2008 |
| WO | 2008114044 | 9/2008 |

* cited by examiner

ELECTRONIC SPRAY DEVICE IMPROVEMENTS

FIELD OF THE INVENTION

This invention relates to electronic spray devices and methods of operation; in particular, to how such devices are driven to deliver controllable and repeatable performance. According to a first aspect of the invention, there is provided an electronic spray device comprising a spray generator, a spray controller for providing a drive signal to the spray generator thereby causing the spray generator to eject liquid droplets, a storage device for, in use, holding at least one parameter of the spray device, means for measuring at least one operational parameter of the spray generator, wherein the spray controller is adapted to modulate the drive signal sent to the spray generator, the modulation being dependent upon the result of a comparison of the measured parameter and the stored parameter.

BACKGROUND OF THE INVENTION

As a result of both the increasing demand from consumers for additional 'smart' functionality in spray devices, and the ever-growing pressure to eliminate the greenhouse gas propellants inherent to traditional aerosol can technology, alternatives to traditional spray technologies are being sought. This has led to the rapid growth in the field of electronic spray technology, and a number of different spray generators have been proposed (U.S. Pat. No. 5,518,179 for example). Because the spray is electronically generated propellants are not required bringing environmental benefits. Additional benefits include controllable performance and an aesthetically pleasing droplet plume.

One area in which such technologies could play an important role is in consumer goods such as personal and household care products. For such products, and often for other spray devices, a degree of portability is a requirement. As such, there is a limit to the size the liquid reservoir can be. Most products in these areas are therefore designed to be fully disposable. Examples include perfume bottles, spray insecticides and detergent sprays. Generally, two technologies are conventionally employed to generate the spray using a conventional spray nozzle; manually operated pumps and pressurised reservoirs. For manually operated pumps, the flow rate is a function of how the consumer uses the device. For pressurised reservoir devices, flow rate is linked to reservoir pressure and is therefore very well controlled; consumers expect the same flow rate every time they use the device and the same flow rate from a new device when their current device runs out. For an electronic spray device, with the user just pressing a button to initiate spraying, a level of repeatability similar to current pressurised devices will be expected.

Electronic spray technologies by definition require a power source and electronic circuitry (henceforth referred to as a spray controller, see FIG. 1) to be incorporated or linked to the spray generator. Such components can add to the overall bill of materials cost. Coupling this to an increased awareness of the impact of waste on the environment leads to a strong requirement to ensure the power source and controller are used for an extended period of time and are not part of any disposable portion of the product. To meet this requirement at the same time as keeping liquid reservoir size reasonable has led to the use of a master and cartridge model in which high cost reusable components are contained in a master part of the overall device and the liquid is contained in a cartridge part of the overall device. When the liquid is used up the cartridge is replaced.

A further benefit of such a model is that it could allow a master component to interact with different cartridges either simultaneously or at different times. For example, a single master could be used to control several cartridges delivering different products (for example different paint types or colours, different fragrances, different skin care formulations). These cartridges could all be connected to the master at the same time or the consumer could connect the cartridge they wish to use to the master as and when they want to use it.

For all such devices, it is often beneficial to ensure all liquid contacting components including the spray generator are part of the cartridge. This avoids the need for a fluidic interface between the master and cartridge which can be complicated to implement in a low cost user friendly embodiment, increases the risk of leakage, requires the spray generator to have a long life and leads to cross-contamination if there is a wish to spray different liquids. Other device models to which the invention described here can also be applied are possible. This includes the spray generator being independently replaceable from both the master unit and the liquid containing cartridge.

For such a model to work, the master component needs to "know" what the product to be delivered is and how to deliver it. U.S. Pat. No. 6,712,287 discusses this requirement and various means for communicating the product type to the master. With such communication means in place, additional information can be exchanged and/or it can be used to inform the user of the product type. WO 2008/004194 includes an embodiment covering this in which information from or about the cartridge is displayed by the master.

This invention is associated with electronic sprays generators in which vibration is used to drive spray creation, more specifically in which vibration of a perforate membrane is used to drive spray creation. An exemplary embodiment of such a device can be found in the eFlow device sold by Pari GmbH. For such devices, the vibration is often generated by applying an alternating voltage across a unimorph or bimorph piezoceramic component or similar. The alternating voltage drives this component into oscillatory deformation at the drive frequency. This deformation is coupled to the perforate membrane causing it to vibrate and generate the liquid spray. Thus the characteristics of the input electrical waveform have a direct bearing on the spray that is generated. Similar drive mechanisms are often used for other electronic spray technologies to which this invention is also applicable.

Such spray generators often have a resonant frequency at which energy is efficiently transferred to the perforate membrane and hence to the liquid. To obtain good performance it is known that the spray generator must be operated at or at least close to the resonant frequency (EP 1,731,228 for example). This is generally achieved by the spray controller scanning a pre-programmed frequency band before commencing spraying and using the results of this to lock into the resonant frequency of the spray generator. The resonant frequency can be periodically checked by the controller whilst spraying so as to capture any shifts in resonant frequency due to changes in liquid loading for example. Such an approach can also be used to detect if a cartridge is present and/or if any liquid is in contact with the spray generator as this can significantly alter the resonant frequency. This information can be communicated to the user through the use of light and sound as is done on the eFlow system.

The resonant frequency of the device can be obtained in several ways. Whilst the various ways may give slightly differing results, all can be used when locking onto the frequency for operation. In an approach, the resonant frequency is characterised in that the power consumption at said frequency when driven with a fixed voltage signal, is greater than the power consumption of the device when driven at frequencies higher of lower than this frequency. In another approach, the resonant frequency is characterised in that the impedance at said frequency when driven with a fixed voltage signal, is lower than the impedance of the device when driven at frequencies higher of lower than this frequency. In another approach, the resonant frequency is characterised as the frequency at which the rate of change of phase with frequency is higher than the rate of change of phase with frequency of the device when driven at frequencies higher of lower than this frequency. All these approaches make use of the fundamental electrical characteristics of the spray generator; the impedance and phase of the device as a function of frequency at the time of spray delivery. EP1731228 WO2008114044 and WO2005097348 all describe such lock in methods.

Whilst scanning a frequency range and locking on to the resonant frequency can assist in the delivery of a more repeatable spray, it does not by itself deliver reliable and repeatable performance. In particular, it does not fully account for manufacturing variation and the impact such variation has on spray performance. For example, it does not account for the absolute impedance of the device which determines how much energy is delivered to it, nor does it account for the amount of this energy that is transferred to the liquid to drive the droplet generation process. This is in part because piezoceramic component performance can vary part to part and batch to batch. Combining this with build tolerances can lead to unacceptable variation in spray performance between spray generators, nominally of the same design. This is especially true for consumer devices in which costs must be kept low, the spray plume is visible to the user and flow rate rather than total dose is the critical performance parameter.

SUMMARY OF THE INVENTION

To further increase cartridge to cartridge spray repeatability, further information needs to be utilised for more than just selecting the optimum drive frequency. Therefore, according to a first aspect of the invention, there is provided an electronic spray device comprising a spray generator, a spray controller for providing a drive signal to the spray generator thereby causing the spray generator to eject liquid droplets, a storage device for, in use, holding at least one parameter of the spray device, means for measuring at least one operational parameter of the spray generator, wherein the spray controller is adapted to modulate the drive signal sent to the spray generator, the modulation being dependent upon the result of a comparison of the measured parameter and the stored parameter.

By comparing at least one piece of stored information with one piece of information measured at the commencement of spraying improved spray repeatability can be realised. In addition to using measured information to modulate the drive signal frequency, measured information can also be used to modulate the drive signal amplitude for example. To do this requires stored information to be used so that the spray controller knows how to modulate the drive signal. For example, to modulate the drive signal amplitude based on the measured impedance with an aim of delivering a specified power level, the target power level must be available to the spray controller and this value compared with the measured power consumption.

The present invention provides, as a second aspect, an electronic spray device comprising: a spray generator; and a spray controller for providing a drive signal to the spray generator; wherein the spray generator includes a perforate membrane which vibrates ultrasonically in response to the drive signal, said vibration causing liquid droplets to be ejected from one side of the perforate membrane; wherein the spray controller is adapted to modulate the drive signal sent to the spray generator; wherein such modulation of the drive signal is arranged to set the mean power level supplied to the spray generator to a target level.

The spray device may further comprise a storage device for, in use, holding at least one parameter of the spray device; means for measuring at least one operational parameter of the spray generator; wherein the modulation of the drive signal is dependent upon the result of a comparison of the measured parameter and the stored parameter.

The present invention also provides, as a second aspect, a method of controlling an electronic spray device having a spray generator; and a spray controller for providing a drive signal to the spray generator, wherein the spray generator includes a perforate membrane which vibrates ultrasonically in response to the drive signal, said vibration causing liquid droplets to be ejected from one side of the perforate membrane; the method comprising the steps of; obtaining information related to how at least one of the spray device's actual characteristics differs from its theoretical characteristics; supplying that information to the spray controller; and modulating the drive signal sent to the spray generator in response to the supplied information; wherein such modulation of the drive signal is arranged to set the mean power level supplied to the spray generator to a target level.

Further preferred features of either the device or method of any aspect of the invention are as follows.

The device may be arranged to modulate the drive signal after it has selected the resonant frequency of the spray generator.

The stored parameter may be related to the spray generator's characteristics and/or may be device specific.

The perforate membrane vibrations are preferably driven by a piezoelectric transducer.

The spray controller may be adapted to move the drive signal frequency away from the spray generator resonant frequency to set the mean power level and/or may be adapted to alter the drive signal voltage to set the mean power level.

The spray controller may be adapted to alter the drive signal time based modulation to set the mean power level.

In a third aspect, the present invention provides an electronic spray device comprising: a spray generator; and a spray controller for providing a drive signal to the spray generator; wherein the spray generator includes a perforate membrane which vibrates ultrasonically in response to the drive signal, said vibration causing liquid droplets to be ejected from one side of the perforate membrane; wherein the drive signal is time based modulated; wherein the liquid to air interface surface in the perforations is drawn back from the ejection side of the membrane during the time based modulation off periods.

In a third aspect, the present invention provides a method of controlling the liquid air interface in the perforations of an electronic spray device having a spray generator; and a spray controller for providing a drive signal to the spray generator, wherein the spray generator includes a perforate membrane which vibrates ultrasonically in response to this drive signal, said vibration causing liquid droplets to be ejected from one side of the perforate membrane, the method comprising the step of: modulating the drive signal using time based modulation such that the liquid to air interface surface in the perforations is drawn back from the ejection side of the membrane during the time based modulation off periods.

In any aspect of the invention, but at least the third aspect, the following features are also preferred.

The liquid to air interface may be caused to move onto the ejection side of the membrane if the spray generator operated continuously.

The overall period of the time based modulation is preferably between 4 milliseconds and 32 milliseconds, more ideally between 8 milliseconds and 16 milliseconds.

The duty cycle is preferably 50% or less, more ideally 20% or less.

A smoothing period may exists when transitioning from the on to off and/or off to on periods, the smoothing period being characterised by the voltage being at an intermediate level or levels between the off voltage and the on voltage.

A gradual change in voltage may be provided during the smoothing period.

The smoothing period is preferably between 0.1 and 5 milliseconds, more ideally between 0.5 and 2 milliseconds.

The spray controller is preferably within a master unit and the spray generator is within a slave unit.

At least a second slave unit may be provided such that the second slave unit is interchangeable with the first slave unit.

BRIEF DESCRIPTION OF THE DRAWINGS

Storing device specific information enables further reliability improvements to be realised and this plus other aspects of the invention are discussed with reference to the following figures.

DETAILED DESCRIPTION OF THE INVENTION

Figure 1:
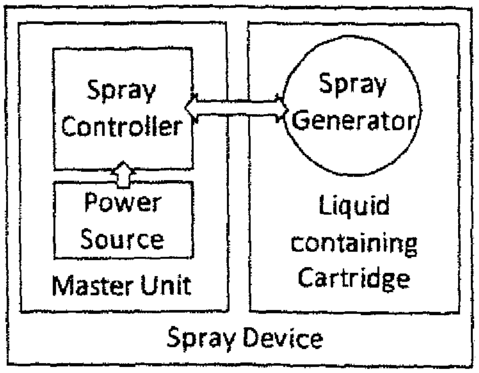
FIG. 1 shows such a device in modular form along with the terminology adopted in this specification.
Figure 2:
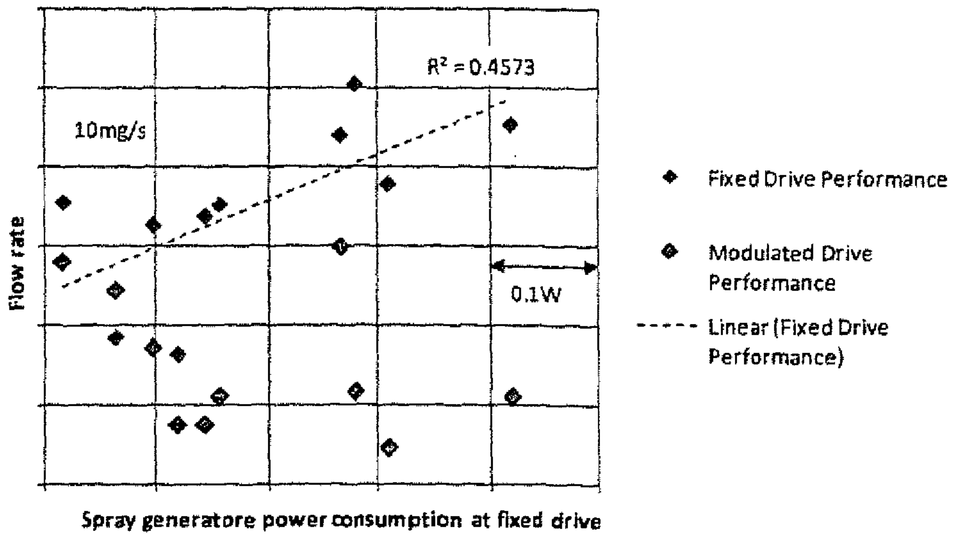
In FIG. 2 the invention is used to improve spray reliability by driving spray generators at a specified power level.

In one embodiment of the current invention, the power consumption at the selected drive frequency when driven with a pre-set drive voltage is measured by the spray controller and the result used to modulate the drive signal. This approach has been successfully used to improve spray generator to spray generator repeatability as illustrated in FIG. 2. In this example, when ten spray generators were driven by a single spray controller at their resonant frequency with a fixed drive signal, the standard deviation in measured flow rate was 11 mg/s and it was found that approximately 45% of this variation (based on $R^2$ values) could be linked to the power consumption of each spray generator. Individual test results for unmodulated operation are shown as black diamonds in this figure. The spray controller was modified to measure the power consumption of the spray generator at the resonant frequency and then modulate the drive signal used to drive the spray generator during spraying with the aim of delivering a specified power level to the spray generator. This resulted in the standard deviation of the measured flow rate reducing to 9 mg/s. The ratio of standard deviation to mean (CV) also reduced through this approach. Individual test results for modulated operation are shown as grey diamonds in the Figure.

Figure 3:
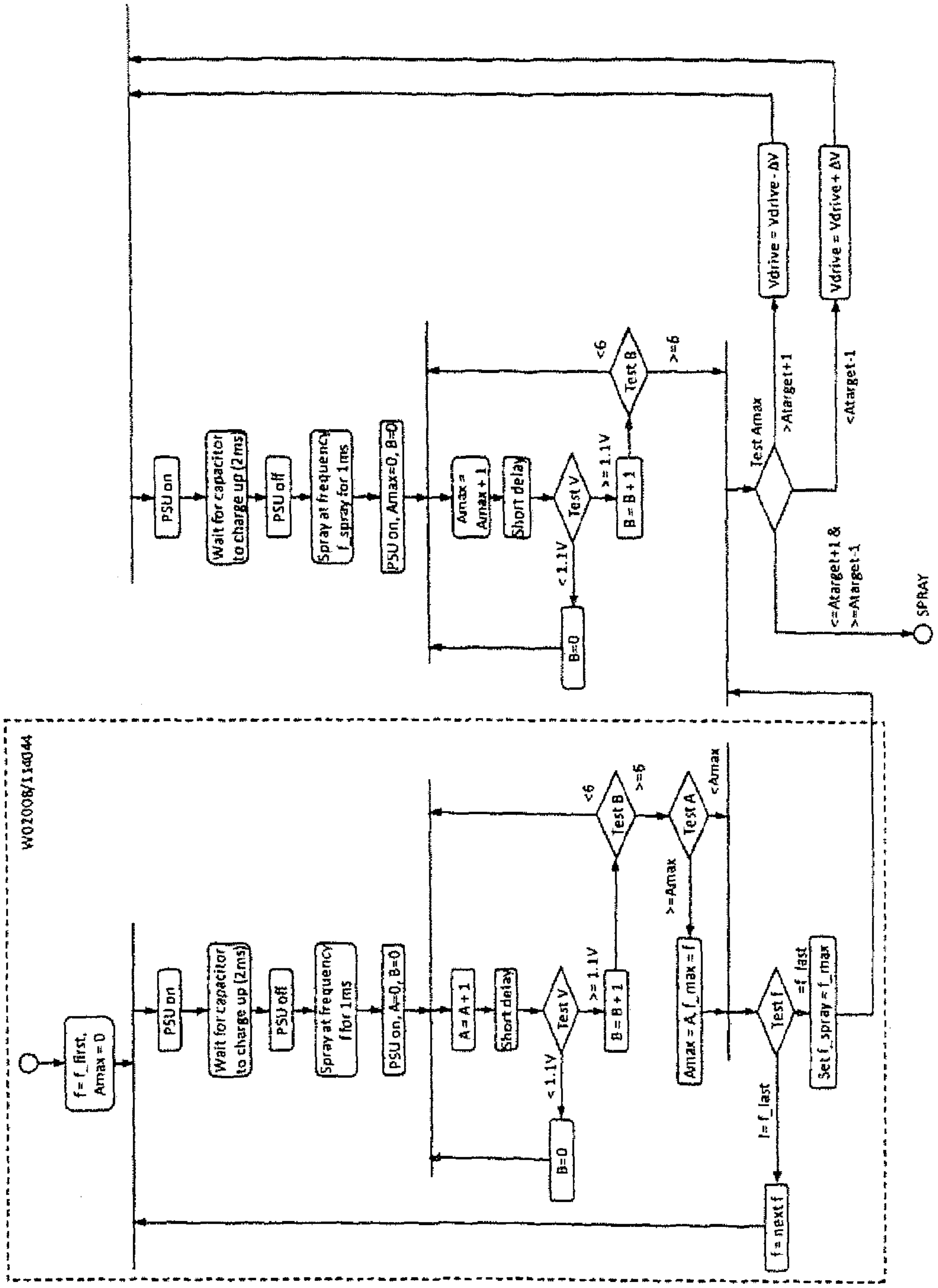
FIG. 3 illustrates how the software in the spray controller could use the measured and stored data to set the power level to a specified value.

It should be understood that, as is done in the prior art when selecting the drive frequency, information from the spray generator does not need to be obtained or measured directly. For example, if measuring power consumption at a certain frequency, the power drain on the batteries could be measured or the voltage drop across a component in the drive circuit during the frequency scan could be measured. Similarly, it should be understood that the spray controller could measure absolute or relative values for use in modulating the drive signal. For example, a reference power sink could be provided to the controller and the difference in power consumption between the spray generator and this reference power sink could be used as the basis for drive signal modulation. In another possible embodiment, referring to WO2008/114044, a second loop could be added to the micro-controller lock in routine as illustrated in FIG. 3. In this second loop, the voltage of the supplied signal to the head is modified until a specified capacitor recharge time is met (within a tolerance range). It should be understood that the approach shown in FIG. 3 is illustrative of a means of carrying out the comparison and should not be taken as a suitably robust method that takes into account noise in the system for example. Several other methods would be obvious to someone skilled in the art. During the first loop, as described in WO2008/114044, the voltage output from the capacitor is amplified by a fixed value during the search for the resonant frequency. This search compares found capacitor recharge times for each frequency tested and selects the frequency with the longest recharge time. As the energy to the spray controller is coming from the capacitor, this equates to the frequency at which energy consumption is highest. Then, in an improvement on WO2008/114044, once this frequency has been found it is fixed and the amplification factor (Vdrive in the Figure) is modified until the capacitor recharge time meets a specified, stored, value (Atarget in the Figure). If this time is less than this specified value then it means power consumption is too low so the amplification of the voltage should be increased. If the time is more than the specified value, then it means power consumption is too high so the amplification of the voltage should be reduced. It is the ability of the spray controller to make use of such a stored value, independent from the characteristics of the spray generator measurable by the spray controller at the time of spray delivery that improves spray repeatability. In this example, it is taken that all the energy supplied to the spray generator during the iterative process is supplied via the capacitor. Utilising a current sense resistor would be another way of measuring power consumption of the spray generator. If the spray generator characteristics vary during spray delivery, such a system as described above could be used to periodically adjust the drive voltage to maintain the required power level.

Where the aim is to deliver constant power to the spray head, adjusting the voltage as performed above may not be the easiest way to accomplish this. An alternative approach would be to set the voltage to the spray generator to a constant level (the maximum level expected to be required across the manufacturing tolerance range), and then utilise time-based modulation of the drive signal to set the mean power delivered to the desired level. Such a modulation approach is discussed in detail later. If utilising time-based modulation then the modulation period, at least during the measuring period, needs to be much less than the measuring period itself so that the mean power delivered to the spray generator is measured. Another alternative approach would be to detune the circuit by moving away from the resonant frequency until the power consumption matches the stored value. For this detuning approach, the initial lock-in step could be skipped although, if the spray generator vibration mode shape varies with frequency, an initial lock in to resonance may be preferred before de-tuning. These three modulation modes (modifying amplitude, utilising time-based modulation and de-tuning) can be used when modulating with the aim of achieving other correlations, not just fixed power.

The optimum modulation approach to deliver repeatable spray generator to spray generator performance will heavily depend on what causes performance variation when a fixed drive signal is used. For example, driving at fixed power will be suitable for units in which the piezoceramic response to a voltage differential varies but the efficiency of the device does not. If, instead, some units converted 10% of the supplied energy to the spray whilst for other units 20% is converted, utilising a constant power approach would not remove variation, indeed such an approach may make such variation worse. Therefore, if a different correlation is found between resonant characteristics and ideal drive parameters, this correlation can be used to apply a pre-programmed correction to the drive parameters. (E.g. If driving at a fixed power consumption level overcorrects spray performance, improved repeatability may be found when driving with voltage mid-way between the default value (used for the frequency sweep) and that required for fixed power operation. If this is the case then the spray controller could be set up to deliver this mid-way voltage to the spray generator during spray delivery.)

Figure 4:
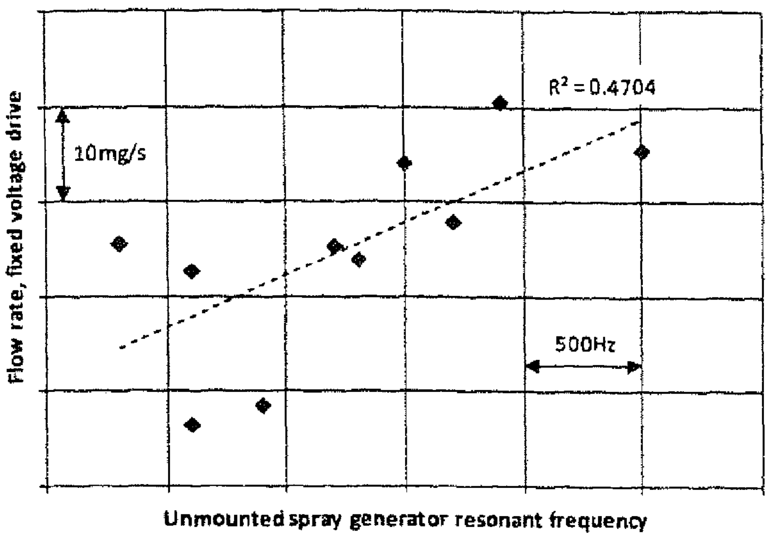
FIG. 4 shows how device specific correlations, in this case available though performing measurements at the time of manufacturing can be used in addition to measurements made at the commencement of spraying.

Expanding on the example discussed above, whilst flow rate was correlated to unit power consumption when driving at the resonant frequency with a fixed signal, improved correlations were available when comparing spray generator performance with characteristics of the spray generator measured prior to assembly into the cartridge. For example, the higher the measured resonant frequency of the unmounted spray generator, the higher the flow rate for a fixed drive signal as can be seen in FIG. 4. Therefore, in one embodiment of this invention, the spray controller uses device specific information, obtained for example as part of the spray generator manufacturing and quality assurance process, in this instance the unmounted, non-liquid-loaded spray generator resonant frequency, to modulate the drive signal supplied to the spray generator. The challenge with this specific correlation though is that different batches of piezoceramic may exhibit the same trends but over different frequency ranges. Therefore, in a preferred embodiment of the invention, both the baseline batch resonant frequency and the device empty resonant frequency are provided to the spray controller. The spray controller can then use the difference between the two values to modulate the control signal.

By device specific information, it is meant information relating to the actual characteristics of the individual device rather than its theoretical design characteristics. For example, a spray generator could be designed to have a perforate membrane with a specified nozzle diameter. In practice, there will be a variation in nozzle diameters across the membrane of any one device and, more importantly, between devices. The design or target mean nozzle size of a membrane is a theoretical design characteristic. The actual mean nozzle size of an individual membrane is its specific characteristic. A device specific characteristic may be based on the characteristics of the single device in question or, where appropriate, it could be based on the characteristics of a batch of devices that form a subset of all devices of the same theoretical design. For example both electroforming and laser drilling can be used to manufacture perforate membranes. For laser drilled membranes, device specific information is likely to be obtained by inspecting each membrane as manufacture is not a batch process. For electroformed membranes, where the nozzle diameter is closely linked to membrane thickness and multiple membranes are manufactured from a single sheet, device specific information could be obtained by only measuring one membrane from the sheet. Device specific information can also be related to the spray controller, for example the actual capacitance of the capacitor used in measuring power consumption in the example above rather than the design capacitance.

Supplied frequency value(s) as described above could be used by the spray controller for more than just modulating the drive signal used during spray delivery. For example, the position of the frequency scan used to find the current resonant frequency of the spray generator could be based on the supplied value(s). Alternatively, or in addition, an estimation of the cartridge fill level could be communicated to the consumer based on the difference in the supplied resonant frequency value and the current resonant frequency. This approach would deliver a more accurate fill level estimate to the consumer than can be achieved by current devices as such devices only know the current resonant frequency. Further, if fill level impacts spray performance, the difference between the current resonant frequency and the empty resonant frequency could be used by the spray controller to further modulate the drive signal so as to maintain consistent spray performance as the unit empties.

Figure 5:
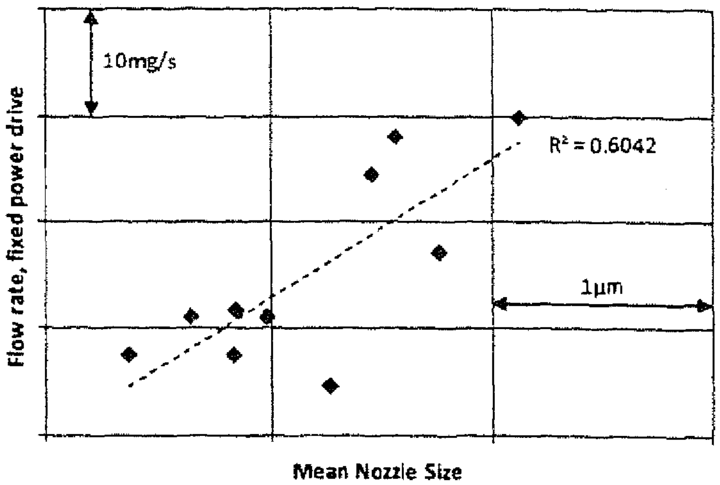
FIG. 5 shows how further reliability improvements can be made by using correlations other than those available from impedance scans.

For the spray generator results presented in FIG. 2, once the modulation was adjusted by the spray controller to deliver a specified power to the spray generator, a large proportion of the remaining variation was found to be linked to the variation in the mean nozzle diameter of each perforate mesh comprising part of the spray generator. This can be seen in FIG. 5. Therefore, in a preferred embodiment of the invention, mean nozzle size data for the spray generator is also provided to the spray controller for use in modulating the drive signal. Whilst such Quality Assurance (QA) data can also be used as part of a production process to reject parts that have parameters outside of a specified range, there is a cost associated with this. A preferred approach is therefore to supply QA data associated with a spray generator to the spray controller for use in modulation of the drive signal with only performance outliers rejected. Possible QA processes include, but are not limited to, measuring physical characteristics of the spray generator such as perforate membrane nozzle size or piezoceramic to membrane concentricity, measuring the impedance characteristics of the spray generator when unmounted, mounted or liquid loaded; using a vibrometer or similar device to measure the amplitude or velocity of membrane vibration when being driven with a known electrical signal at or away from the resonant frequency; and spray testing the spray generator with a fixed drive signal and measuring the resultant flow rate. If variation is driven by batch to batch variation (for example if changes caused by variation in piezoceramic performance from one batch to another impact spray flow rate), then QA performed on a subset of manufactured heads could be linked to all heads in the batch.

It should be understood that the supplied information could be that required to deliver a baseline performance setting. The user could then adjust performance away from this baseline if desired if the spray controller included this feature.

Information such as that described above may be communicated to the spray controller in a range of ways including but not limited to:

mechanical features on the spray generator or on the cartridge housing, the presence of a custom resistive or capacitive components in series, parallel or physically connected but electrically separated from the spray generator, the presence of a programmable chip in series, parallel or physically connected but electrically separated from the spray generator, the use of an RF tag embedded on the spray generator or cartridge or other wireless based communication means, the use of a unique identifier encoded using one of the above means that can be linked to the relevant drive parameter using a look-up table, or other reference source, accessible to the spray controller.

Further, the correlation required to improve spray repeatability based on the supplied information could be carried out on the spray controller or prior to encoding in one of the ways listed above. For example if the power delivered to the spray generator is set by monitoring the recharge time of a capacitor and using this information to change the amplification of the signal, the target recharge time could be calculated by the spray controller based on supplied information or the target recharge time could be the information supplied.

Using the spray controller to modulate the drive signal to deliver improved repeatability may require certain components on the spray controller to be accurately made or specified so that spray controller component variation does not lead to spray generator performance variation. For example, when using a capacitor and timing circuit to deliver a specified power to the spray generator as described earlier, the capacitor value and timing clock accuracy will impact the supplied power to the spray generator. One way to minimise the impact of this is to use accurate components in the manufacture of the spray controller but this may increase bill of materials cost. Another approach would be to use an accurate resistive component on the spray controller and use this to reference other components from. For example, the capacitor discharge rate could be correlated through discharging its stored energy through such a resistor. Alternatively, during the spray controller manufacturing process, a known load that mimics a spray generator could be used to calibrate the spray controller with this calibration information stored on the controller.

For example, in an embodiment using capacitor recharge time after a fixed duration drive to measure power:

During spray controller manufacture and QA the capacitor recharge time when connected to a known load is measured and stored on the spray controller.

During spray generator manufacture and QA, the required capacitor recharge time relative to the known load (i.e. a correction value) is calculated based on known correlations and linked to the spray generator.

Prior to spraying commencing and following the selection of the resonant frequency, the power to the spray generator is adjusted by the spray controller until the capacitor recharge time equals the value stored on the spray controller corrected by the value linked to the spray generator.

Figure 6:
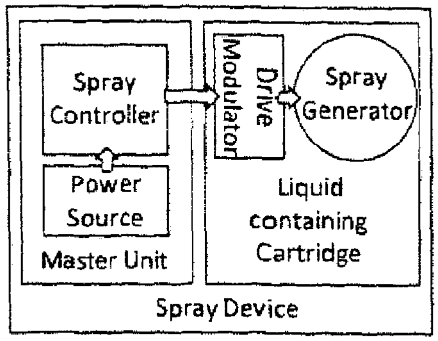
FIG. 6 shows a less beneficial approach to improving spray reliability.

Rather than supplying the spray controller with QA information on the spray generator connected to it, a drive modulator component could be connected either in series or in parallel with the spray generator in the cartridge such that, when driven with a fixed drive signal by the spray controller, this signal is modulated such that the signal received by the spray generator is that required to enable more repeatable spray generator to spray generator performance. Such an embodiment is shown in FIG. 6. An obvious embodiment of such a modulator would be a resistor in series with the spray generator with resistor value set based on quality assurance data and the previous correlation of this data with spray performance. There are several disadvantages of this approach compared to the invention disclosed here. Firstly, the spray generator would have to supply enough power to support all spray generators with the more efficient generators dissipating power in their connected modulator. This increases mean unit power consumption and, for a portable device, will lead to reduced life for a given battery capacity. A second disadvantage is that if the measured data varies through the life of the spray generator, this cannot be accounted for or, for example when calculating liquid level, utilised.

Further Use of a Duty Cycle and Related Details

As mentioned above, in addition to modification of frequency and/or voltage, another way to impact spray performance is through the use of time-based modulation of the drive signal, which we shall call "duty cycling". For pressurised sprays in industrial environments, pulsing of the spray by turning a valve on and off rapidly is used to adjust flow rate. This is commonly referred to as pulse width modulation. In general, flow rate is linearly proportional to on-time, thus a reduction in duty cycle from 100% (constantly on) to 50% (on half the time) would approximately halve the flow rate.

It is non-obvious that this approach would work with an electronic spray as there is no valve to switch and the drive signal oscillates at high frequency to drive the spray generation process. However, it has been demonstrated that time-based modulation of this drive signal can be used to adjust the average flow rate of an electronic spray device. This approach works by applying the high frequency drive signal in bursts with gaps of no, or reduced, signal in between. With consumer perception critical, unlike in industrial sprays, the overall period of this drive regime (burst time plus gap time) must be short enough that the plume appears to be continuous. This requires the overall period to be less than approximately 30 milliseconds, more ideally, less than 15 milliseconds.

Further, when using a perforate membrane device to spray some liquids, in particular those with low surface tension, "wetting out" of the front face can occur leading to a break down of the plume generating mechanism. "Wetting out" occurs when a drop of liquid being ejected through a nozzle does not break free of the membrane surface but instead is pumped to the outer surface and wets out on this surface. If enough drops fail to leave the surface in this manner, liquid can pool on the front face of the membrane and trigger similar failure modes at neighbouring nozzles and an overall breakdown of the spray. One way to avoid such behaviour is to employ a reduced duty cycle. This approach works as perforate membrane devices typically require, or generate, a lower pressure on the liquid side of the membrane than the air side. Pausing the spray generation process for a period allows this pressure difference to draw back (to the liquid side of the membrane) any liquid that is pumped through the nozzles and onto the front face.

Figure 7:
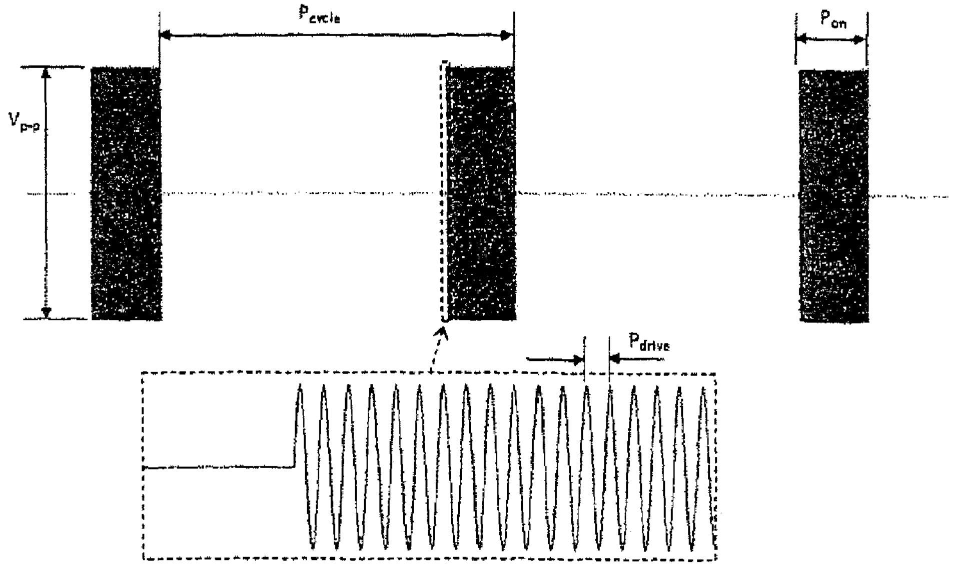
FIG. 7 shows how time based modulation can be used to modulate the drive signal.

FIG. 7 illustrates a duty cycled drive signal in which the overall period, $P_{cycle}$, is 10 milliseconds and the on period, $P_{on}$, is 2 ms. Also shown on this Figure is the peak-to-peak voltage amplitude of the signal, $V_{pp}$, and the period of the primary waveform, $P_{drive}$, that is at the resonant frequency of the spray generator.

Figure 8:
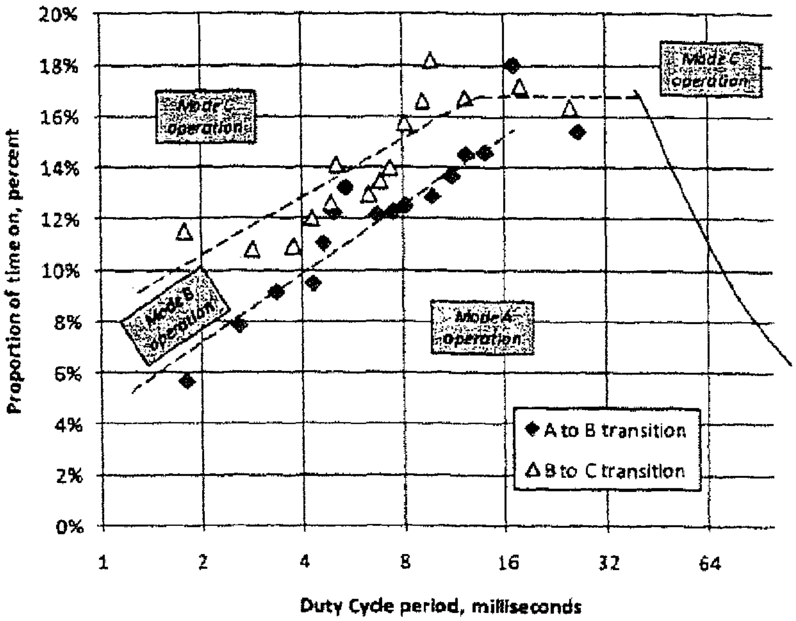
FIG. 8 shows how time based modulation can be used to enable delivery of liquids that 'wet out' whilst also controlling noise generation.

The required ratio of on period to overall period (duty) is very dependant on the liquid and spray generator combination. In general, if wetting out is a problem then a duty of 50% or less is required (i.e. the on period is less than or equal to the off period). For more challenging liquids, a significantly lower duty is required sometimes 20% or less, sometimes closer to 10%. This can be seen by the example in FIG. 8. This figure was generated based on an experiment utilising a perforate membrane spray generator delivering a liquid emulsion with a high tendency to wet out. Three modes of operation were seen depending on the duty and overall modulation period: Mode A is acceptable spray generation. In this mode some fluid may be visible on the front face of the spray generator but only in nodal positions (i.e. positions at which the perforate membrane is not moving). Mode B is also acceptable spray generation but in this mode some fluid was seen to wet out between nodal positions. In Mode C the spray generation starts to break down with some visibly much larger droplets being ejected from the spray generator and, in extreme cases, liquid exiting the spray generate in a constant stream. The figure was generated by selecting a burst number (i.e. the number of waveforms of period $P_{drive}$ from FIG. 7), setting the overall period high enough such that the spray generator was in Mode A and then reducing the period until the Mode B and then Mode C were encountered. As the burst number was increased, the maximum achievable duty was also seen to increase until a period of approximately 15 milliseconds was reached. Beyond this point, the spray stopped looking continuous and it became harder to judge transitions between modes, especially A to B. It was though observed that regardless of the overall period, a maximum burst number of approximately 700 was possible regardless of duty, this is represented by the solid line to the right of the figure. Whilst the detail of FIG. 7 is dependant on the liquid and spray generator used, it has been seen that the optimum period is generally similar to that seen here; ideally in the 4 millisecond to 32 millisecond range to enable maximum fluid delivery, more ideally in the 8 millisecond to 16 millisecond range.

A feature of employing a duty cycle at such a period is that it leads to audible harmonics. For example, whilst the drive frequency of the device may be ultrasonic, turning this drive on and off with a period of 10 ms will lead to sound being generated at 100 Hz and higher harmonics. Such sound may be beneficial. For example if the consumer product is designed to deliver liquid to the face (which is likely to require the eyes to be closed) or to an area of the body which cannot be easily seen then using the spray element to generate sound whilst spraying may assist the user in locating the device. A separate audio buzzer could be included but this increases the device bill of materials and requires space in the device housing. For such cases, and where a duty cycle is not required to achieve good spray performance, using a drive regime with a very high duty cycle may be beneficial. In a preferred embodiment, repeating a burst period of 2.764 milliseconds followed by an off period of 0.1 milliseconds will create sound at 349.2 Hz, the note F4 on a piano. This example has a duty of 96.5% meaning only a small reduction in flow rate compared to being fully on. From experimentation it was found that the minimum off period required to generate sufficient sound volume was 0.05 milliseconds, more ideally 0.1 milliseconds. Increasing the off period further gave diminishing returns in relation to volume and led to an increasing reduction in flow rate. With perforate membrane devices designed to oscillate ultrasonically, they generally produce increasing volume, and a clearer tone at higher audible frequencies but high frequencies may be perceived as annoying rather than pleasant. Therefore in an ideal embodiment, such a device would be operated with an overall duty cycle period of between 1 millisecond and 5 milliseconds, more ideally with an overall duty cycle period of between 2 milliseconds and 4 milliseconds. This ideal period will create sound in the 250 Hz to 500 Hz range, which is generally considered pleasant.

Figure 9:
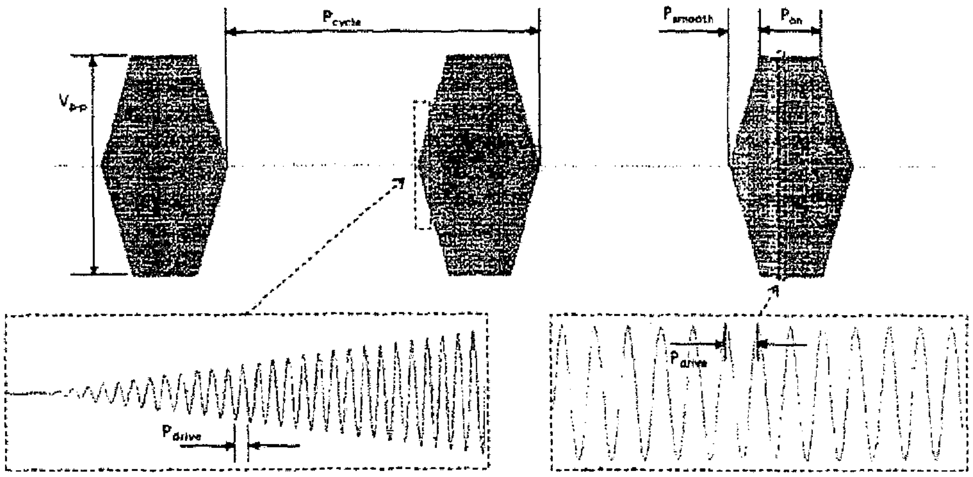
FIG. 9 shows how various time based modulation aspects of the invention can be combined together.

The ideal range of operation for creating sound when spraying is outside of that ideal range required to enable the spray delivery of liquids that have a tendency to "wet out" through a perforate membrane. Further, in some embodiments it may be beneficial or desired to produce no sound. Therefore if a duty cycle is employed to avoid the front surface of the perforate membrane wetting out, a technique is required to reduce the sound level to a minimum. A preferred approach to achieving this is to smooth the duty cycle as illustrated by FIG. 9. Rather than abruptly switching between a burst at the selected drive voltage and a gap, the amplitude of the signal is modulated with voltage ramping up over a smoothing period, $P_{smooth}$, prior to the burst and then ramping down with a smoothing period after the burst. This leads to reduced amplitude harmonics and significantly reduced sound.

Figure 10:
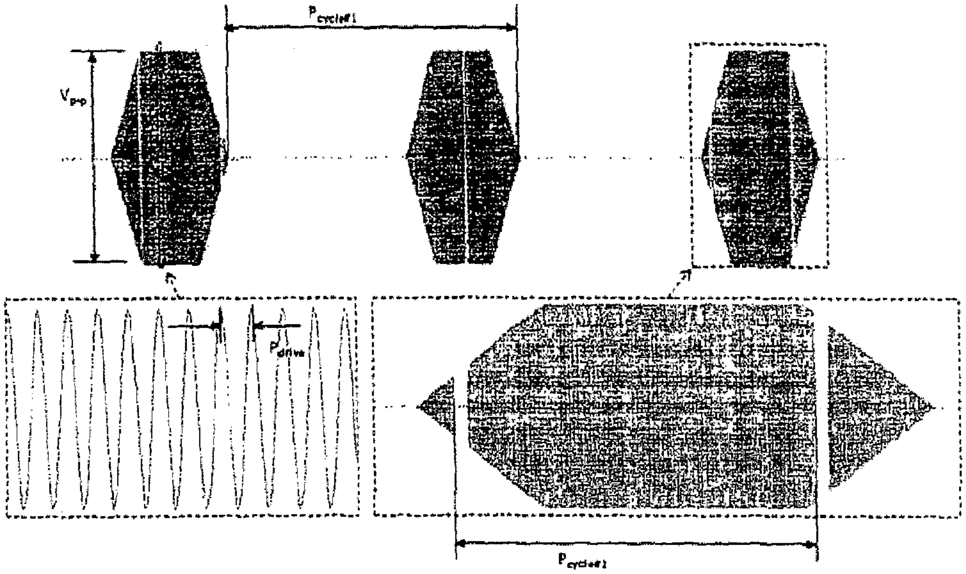
FIG. 10 shows another example of how different time based modulation aspects of the invention can be combined together.

The approaches described above can be combined for example by using a 96.5% duty cycle with a period of 2.764 milliseconds, $P_{cycle\#2}$, to create a pleasant sound at the same time as a smoothed 20% duty cycle with a 10 millisecond period, $P_{cycle\#1}$, to enable the delivery of a difficult liquid. This is illustrated in FIG. 10.

The invention claimed is:

1. A method of controlling the liquid air interface in the perforations of an electronic spray device having a spray generator; and a spray controller for providing a drive signal to the spray generator, wherein the spray generator includes a perforate membrane which vibrates ultrasonically in response to this drive signal, said vibration causing liquid droplets to be ejected from one side of the perforate membrane, the method comprising the step of:

modulating the drive signal using time based modulation such that the liquid to air interface surface in the perforations is drawn back from the ejection side of the membrane during the time based modulation off periods.

2. A method according to claim 1, wherein the liquid to air interface would move onto the ejection side of the membrane if the spray generator operated continuously.

3. A method according to claim 1, wherein the overall period of the time based modulation is between 4 milliseconds and 32 milliseconds, more ideally between 8 milliseconds and 16 milliseconds.

4. A method according to claim 1, wherein the duty cycle is 50% or less, more preferably 20% or less.

5. A method according to claim 1, wherein a smoothing period exists when transitioning from the on to off and/or off to on periods, the smoothing period being characterised by the voltage being at an intermediate level or levels between the off voltage and the on voltage.

6. A method according to claim 5, wherein there is a gradual change in voltage during the smoothing period.

7. The method according to claim 5, wherein the smoothing period is between 0.1 and 5 milliseconds, more ideally between 0.5 and 2 milliseconds.

8. A method according to claim 1, wherein the spray controller is within a master unit and the spray generator is within a slave unit.

9. A method according to claim 8, wherein the electronic spray device further comprises at least a second slave unit interchangeable with the first slave unit.

* * * * *